US008918451B2

(12) United States Patent
Heeren et al.

(10) Patent No.: US 8,918,451 B2
(45) Date of Patent: Dec. 23, 2014

(54) SYSTEM AND METHOD FOR PROVIDING SERVICE COMPONENT ARCHITECTURE (SCA) DATA TRANSFORMATION

(75) Inventors: Edward Heeren, Berkeley Heights, NJ (US); Maurice Gamanho, Lebanon, NJ (US)

(73) Assignee: Oracle International Coproration, Redwood Shores, CA (US)

( * ) Notice: Subject to any disclaimer, the term of this patent is extended or adjusted under 35 U.S.C. 154(b) by 64 days.

(21) Appl. No.: 12/646,704

(22) Filed: Dec. 23, 2009

(65) Prior Publication Data

US 2011/0153726 A1 Jun. 23, 2011

(51) Int. Cl.
*G06F 15/16* (2006.01)
*G06F 9/54* (2006.01)
*G06F 15/177* (2006.01)
*G06F 9/44* (2006.01)

(52) U.S. Cl.
CPC ..................................... *G06F 9/541* (2013.01)
USPC ............................ 709/203; 709/220; 717/121

(58) Field of Classification Search
USPC .......................................................... 709/203
See application file for complete search history.

(56) References Cited

U.S. PATENT DOCUMENTS

2008/0126474 A1* 5/2008 Beisiegel et al. ............. 709/203
2008/0294754 A1* 11/2008 Lu et al. ........................ 709/220
2010/0004968 A1* 1/2010 Booz et al. ........................ 705/8

* cited by examiner

*Primary Examiner* — John Follansbee
*Assistant Examiner* — Alan S Chou
(74) *Attorney, Agent, or Firm* — Meyer IP Law Group (57) ABSTRACT

A system and method for providing service component architecture (SCA) data transformation in a distributed transaction processing environment. In accordance with an embodiment, an SCA software component can be used to provide a service to transform data and requests from a service-oriented data format to a transactional data format, such as a Tuxedo or other format. In accordance with an embodiment, a configuration file, such as a schema file, is used to define the transformation between the service-oriented and transactional data formats. The SCA software components operate to communicate with a transaction component, perform the data transformation automatically, and support a transaction process on the transaction component.

20 Claims, 5 Drawing Sheets

A C++ interface to perform data transformation

```
1  #include <string>
2  namespace services
3  {
4      namespace simpapp
5      {
6          /**
7           * business interface
8           */
9          class Toupperservice
10         {
11             public:
12                 virtual std::string
13                 toupper(const std::string input String) = 0;
14         };
15     } // End simpapp
16 } // End services
```

Figure 3

```
long myMethod(commonj::sdo::DataObjectPtr data);
```
— 401

```
<xsd:schema xmlns:xsd=http://www.w3.org/2001/XMLSchema
    xmlns="http://www.example.com/myExample"
    targetNamespace="http://www.example.com/myExample">

<xsd:element name="bike" type="BikeType"/>
    <xsd:element name="comment" type="xsd:string"/>

<xsd:complexType name="BikeType">
        <xsd:sequence>
            <xsd:element name="serialNO" type="xsd:string"/>
            <xsd:element name="name" type="xsd:string"/>
            <xsd:element name="type" type="xsd:string"/>
            <xsd:element name="price" type="xsd:float"/>
        </xsd:sequence>
    </xsd:complexType>
</xsd:schema>
```
— 402

```
#name       number      type        flag    comment
#-------------------------------------------------------
bike        20          fml22       --
comment     30          string      --
serialNO    40          string      --
name        50          string      --
type        60          string      -
price       70          float       --
...
```
— 403

SYSTEM AND METHOD FOR PROVIDING SERVICE COMPONENT ARCHITECTURE (SCA) DATA TRANSFORMATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention generally relates to middleware and transaction-based systems, and in particular to a system and method for providing Service Component Architecture (SCA) data transformation in a middleware or transaction-based system.

BACKGROUND

Middleware platforms, such as Tuxedo, provide support for distributed transaction processing in an enterprise-level computing environment. Such platforms, including Tuxedo, are particularly adept at unlocking enterprise legacy applications, and extending those enterprise legacy applications so that they can be used in a service-oriented manner, while at the same time delivering scalability and standards-based interoperability.

The term Service-Oriented Architecture (SOA) generally refers to a more recent software strategy which organizes the discrete functions contained within enterprise applications into interoperable, standards-based services, which can then be combined and reused to meet particular business needs. The related Service Component Architecture (SCA) describes a model for building applications and systems using SOA, and further builds on open standards, such as Web services, to extend and complement existing SOA approaches. The eXtreme Transaction Processing (XTP) describes an application style aimed at implementing large-scale, business-critical, transactional applications on the basis of distributed architectures, which in turn are implemented by leveraging commodity hardware and standards-based software.

These are the general environments within which embodiments of the present invention are intended to be used.

SUMMARY

Disclosed herein is a system and method for providing service component architecture (SCA) data transformation in a distributed transaction processing environment. In accordance with an embodiment, an SCA software component can be used to provide a service to transform data and requests from a service-oriented data format to a transactional data format, such as a Tuxedo or other format. In accordance with an embodiment, a configuration file, such as a schema file, is used to define the transformation between the service-oriented and transactional data formats. The SCA software components operate to communicate with a transaction component, perform the data transformation automatically, and support a transaction process on the transaction component.

In accordance with an embodiment, an SCA extension for the Tuxedo ATMI interface is provided, which allows for seamless data transformation between SCA applications and Tuxedo clients or servers. Tuxedo clients and servers can access data using standard Tuxedo buffer types, such as FML32, FML, VIEW32, VIEW, MBSTRING, STRING and other Tuxedo buffer types, and the data is automatically transformed to or from standard SCA data types. This allows one side of the application to use Tuxedo buffer types while the other side can use SCA buffer types. Support is also provided for SCA to SCA mode applications. Both sides of the application can use SCA data transformation APIs, and the Tuxedo FML32 datatype can be used to transmit the data from one side of the application to the other. The net effect is that SCA applications can be combined with existing Tuxedo applications without requiring any change to the Tuxedo applications; and new hybrid SCA-Tuxedo applications can be developed with each side of the application using the APIs that are best suited for that software.

DETAILED DESCRIPTION

Embodiments of the invention are illustrated herein by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

The description of various embodiments of the invention as following uses Tuxedo functions or libraries as an example for distributed transaction functions or libraries. It will be apparent to those skilled in the art that other types of distributed transaction functions or libraries can be used without limitation.

In accordance with an embodiment, the system provides a transaction capability for Service Component Architecture (SCA) components in a Service Oriented Architecture (SOA) environment. The system allows SCA components to run on top of a transaction platform, such as, for example, the Tuxedo infrastructure. In accordance with an embodiment, an SCA Container provided in Tuxedo can take advantage of Tuxedo's important features: such as reliability, availability, scalability, and performance. In addition, The SCA Container in Tuxedo can integrate Tuxedo closer into an SOA environment. In accordance with an embodiment, enabling SCA in Tuxedo also contributes to solving the complex distribution requirements of eXtreme Transaction Processing (XTP).

In accordance with an embodiment, data transformation can be performed automatically between a SCA data format and a non-SCA data format, such as a transactional manager interface format, in order to support one or more transaction processes on a transactional server in a service-oriented environment. Here, both the SCA data format and the non-SCA data format can be either transactional or non-transactional.

A schema file can be used to define data transformation between the SCA data format and the non-SCA data format. Based on the schema, data transformation can be performed automatically on the transaction data, so that a software component can communicate with the transaction server. In accordance with an embodiment, the transaction server includes one or more transaction processes. Each of the transaction processes can use one or more services provided by a software component in the service-oriented environment to handle the one or more transaction data. The transaction processes at a transaction component, which consumes the transaction data, can also be invoked by other software components in the service-oriented environment.

System Architecture

SCA provides a programming model that aims at simplifying component re-use, and providing seamless communications between components. A Service Component Definition Language (SCDL) describes what components can perform in terms of interactions between each other, and instructs the framework to set-up necessary links or wires. As used in SCA, SCDL is an XML based language that is used to describe services, references, wires, components, and composites.

In an SOA environment, a SCA component is a configured instance of an implementation that includes the defined properties, provided services, and required service references. The aggregation of one or more components is referred to as a "composite". A "service" is a business function provided by a SCA component. A "reference" is a SCA component dependency on a service. A "wire" is a link between a service and a reference.

In accordance with an embodiment, a programming interface (API) is provided to support the development of transactional applications. For example, in accordance with an embodiment, a modified form of the Application-to-Transaction Monitor Interface (ATMI) is provided, which enables native Tuxedo applications to communicate with SCA components. In accordance with an embodiment, an ATMI binding and SCA container also enables SCA applications to take advantage of the Tuxedo framework, and allows SCA components to interoperate with native Tuxedo processes. In this manner, SCA applications can be combined with Tuxedo applications in an integrated environment, without requiring any change to the Tuxedo applications themselves. The applications in such an integrated environment can use those portions of APIs from both Tuxedo and SCA that are best suited to the particular application. In addition, the capabilities of the Tuxedo complex data type, such as FML32, can be used within SCA applications. In this manner, smooth interoperability and/or migration to/from Tuxedo and SCA can be achieved, and newer SOA-like capabilities can be easily introduced into the Tuxedo environment.

Figure 1:
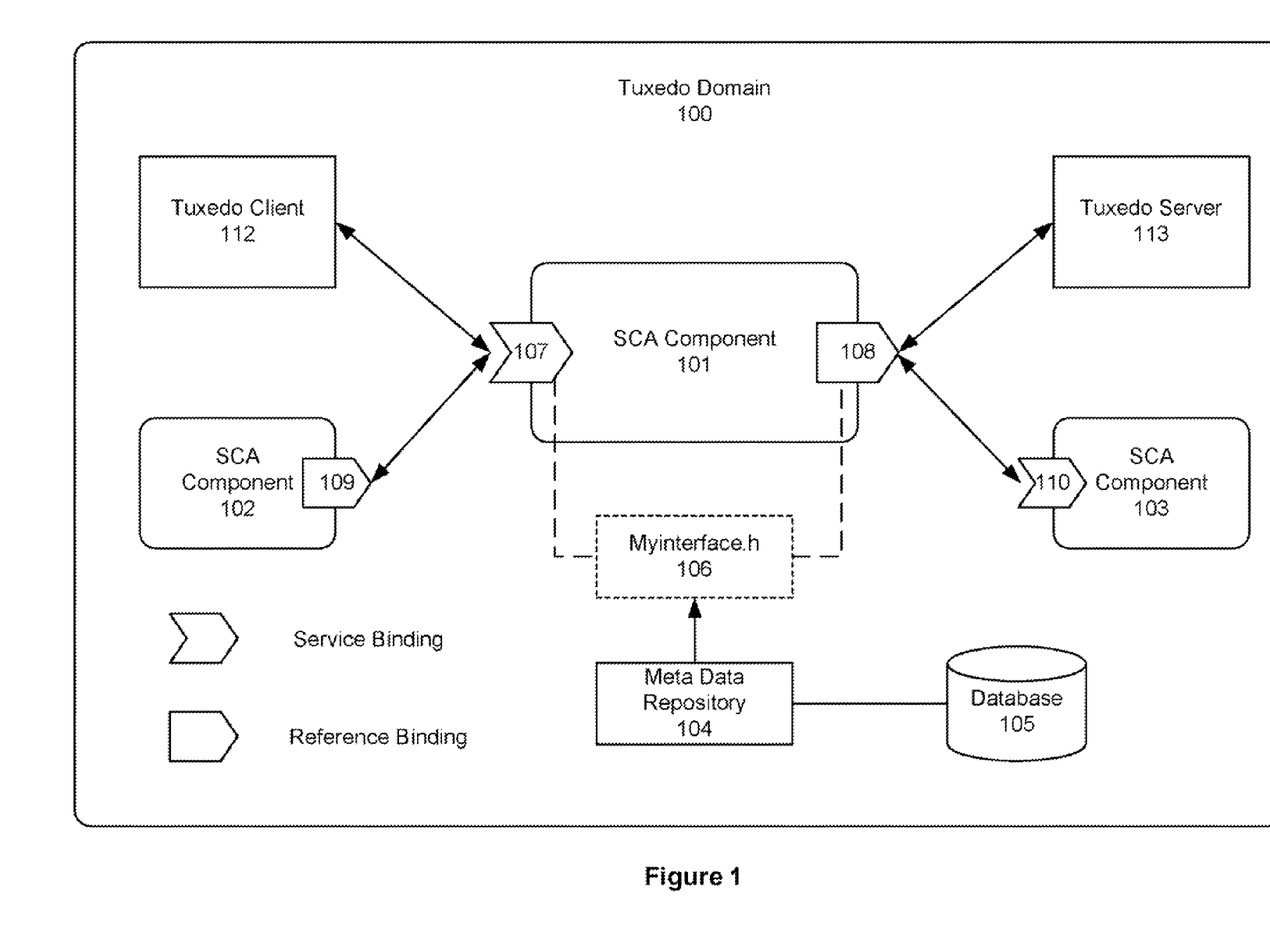
FIG. 1 is an illustration that shows the general architecture of an SCA container with ATMI binding, in accordance with an embodiment.

FIG. 1 is an illustration that shows the general architecture of an SCA container with ATMI binding, in accordance with an embodiment. As shown in FIG. 1, a domain, such as a Tuxedo domain 100 includes different software components, such as a plurality of SCA components 101, 102 and 103, a Tuxedo client 112, and a Tuxedo server 113. By way of example, SCA component 101 can include a service binding 107 and a reference binding 108, and can use the service binding to provide service either to another SCA component 102, through the reference binding 109 on the other SCA component; or to a Tuxedo client 112. Similarly, SCA component 101 can use the reference binding to call either on a service provided by another SCA component 103; or on a Tuxedo server 113. As shown in FIG. 1, the other SCA component 103 similarly provides service through its service binding 110. The system further includes a metadata repository 104, which contains service metadata in the Tuxedo domain, is connected to a database 105, and can be referred through a published interface, e.g., Myinterface.h 106.

Runtime Reference Binding Extension

In accordance with an embodiment, a runtime reference binding extension is provided as an implementation of the client-side aspect of the SCA container. The runtime reference binding encapsulates the necessary code to call other services, such as SCA components, Tuxedo servers, Web Services, and other services, transparently from an SCA-based component.

Users of the runtime reference binding extension, such as client applications, can provide different environment variables. These environment variables can be used by the SCA framework, in particular by an SCA kernel implementation that configures and manages the SCA environment. In addition, these environment variables can override the same parameters that are passed using command-line options. The followings are examples of these environment variables:

SCA_ROOT: path to the root of this SCA configuration, from where SCDL files are loaded.

SCA_COMPONENT: name of the default CompositeContext, which allows client applications to omit looking up a component.

In accordance with an embodiment, users use a buildsca-client command that encapsulates the environment variables above to perform calls over the Tuxedo infrastructure. The resolution of Tuxedo service and other parameters passed in the binding declaration are performed transparently. In accordance with an embodiment, checks can be made for process initialization and runtime, and an exception can be thrown if necessary.

In accordance with an embodiment, an ATMI binding reference can be used in a client-only application. Strict client applications, as opposed to server components making client calls, are programs that only make references to other SCA components. These programs load the SCDL model by calling the CompositeContext::getCurrent( ) method. Client applications can join a Tuxedo application and have the same characteristics as a regular ATMI client performing tpinit( ) with the TPMULTICONTEXTS flag. Such a client, which makes more than one reference via the ATMI binding, can issue one tpinit( . . . TPMULTICONTEXTS) call per reference. The call can be made at service lookup time (i.e. when calling CompositeContext::locateService( )). tpterm( ) can be invoked internally, when the CompositeContext object, obtained by calling CompositeContext::getCurrent( ) goes out of scope or an exception is caught. Successive calls to CompositeContext::locateService( ) can therefore not perform successive tpinit( ) calls. Each reference can have an associated Tuxedo application context that is internally shared among multiple threads if the client application is multi-threaded.

Runtime Service Binding Extension

In accordance with an embodiment, a runtime service binding extension is provided as an implementation of the server-side aspect of the SCA container. The runtime service binding extension encapsulates the necessary code and framework components to allow other SCA components, existing Tuxedo clients, or other service requesters, to transparently call SCA-based components.

In accordance with an embodiment, SCA components can be contained in shared libraries, used by the SCA kernel or the SCA framework. The runtime service extension can resolve these libraries at run-time, using the environment information below:

SCA_ROOT—path to the root of this SCA configuration, from where SCDL files are loaded.

In accordance with an embodiment, a generated Tuxedo SCA server can dynamically link to SCA composites that declare services with bindings of type ATMI. This server can be generated using the buildscaserver command. In one example, this server can be added to a configuration file in order to include the SCA components, which it hosts as part of the Tuxedo application. The service binding extension code can then be linked to the server stub. This server can advertise services corresponding to the deployment rules. Requests received by the server can be assumed to be in a format suitable for processing by SCA components.

In accordance with an embodiment, in an environment such as Tuxedo, an SCA component implementation can be bootstrapped inside a Tuxedo server, so that the Tuxedo framework can forward requests to the Tuxedo server and send replies back to the client processes. The SCA component implementations can also be encapsulated in the Tuxedo server process.

In accordance with an embodiment, components can be built as SCA components, to create a number of shared libraries whose entry points correspond to the interfaces defined for the implementations. A Tuxedo server can then be built and constructed by parsing the corresponding SCDL code and interfaces. This generates a source file that dynamically advertises different Tuxedo services. The number of different Tuxedo services is defined by the <service> elements in the SCDL code that contains <binding.atmi> elements. The format of the binding provides a hint as to what actual method can be exposed by each Tuxedo service. Methods without a corresponding ATMI binding may not be exposed through Tuxedo.

In one example, the code generated in the above step contains the following functions:

A loadSCAComponents( ) function that takes the list of libraries (given by SCDL) and loads them dynamically.
An unloadSCAComponents( ) function that unloads the above libraries.
The tpsvrinit( ) function and dynamic reloading capability have access to the above two functions.
A mechanism to ensure that threads can be put in a quiescent state before the dynamic reloading capability can be performed.

In addition, each server can advertise a number of extra services for administrative purposes. These services can be invoked using a scaadmin tool. New servers hosting new composites are allowed to be added like normal Tuxedo application servers by dynamically configuring the Tuxedo application.

SDO Mapping and Data Transformation

An important part of SCA is the Service Data Objects (SDO) protocol that allows heterogeneous data to be accessed in a uniform way. SDO is used to simplify data programming and let the developer to focus on the business logic implementation instead of underline data programming technology.

In accordance with an embodiment, SCA data transformation capabilities are provided for the transformations from SCA Service Data Objects (SDO) to Tuxedo data types, and the transformations from Tuxedo data types to SCA Service Data Objects (SDO). In addition, SCA data transformation capabilities are provided for both C++ applications and Java® applications using the JATMI interface. In addition, the data transformation capabilities can also be developed to support a C implementation of SCA.

In accordance with an embodiment, the system allows for seamless data transformation between SCA applications and Tuxedo clients or servers. Tuxedo clients and servers can access data using standard Tuxedo buffer types such as FML32, FML, VIEW32, VIEW, MBSTRING, STRING and other Tuxedo buffer types. These Tuxedo format specific data can be automatically transformed to/from standard SCA data types. Support can also be provided for SCA-to-SCA mode applications. For example, one side of an application can use Tuxedo buffer types, and the other side can use SCA buffer types. Both sides of the application can use SCA data transformation APIs, and the Tuxedo FML32 data type can be used to transmit the data from one side of the application to the other.

Figure 2:
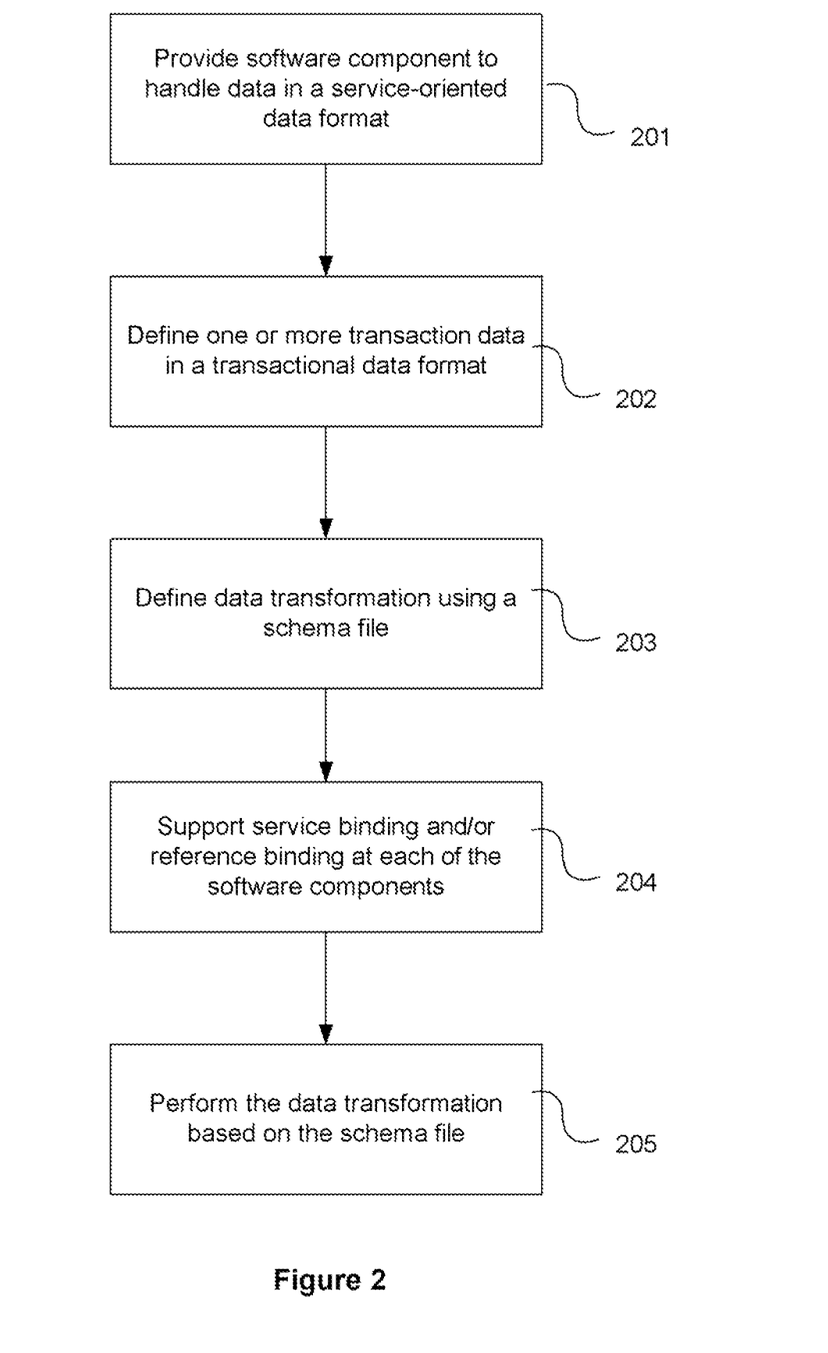
FIG. 2 is an illustration that shows the data transformation between SCA applications and Tuxedo clients or servers, in accordance with an embodiment.

FIG. 2 is an illustration that shows a method for data transformation between SCA applications and Tuxedo clients or servers, in accordance with an embodiment. As shown in FIG. 2, one or more software components in a Service Oriented Architecture (SOA) environment is provided to handle data in a service-oriented data format at step 201. In addition, a transaction server defines one or more transaction data in a transactional data format at step 202. An XML or other schema can define data transformation of the one or more transaction data between the service-oriented data format and the transactional data format at step 203. Then, service binding and/or reference binding can be supported at each of the one or more software components, in order to communicate with the transaction platform at step 204. Finally, the schema can be used to perform the data transformation automatically at step 205.

In accordance with an embodiment, data transformation used by Tuxedo as a binding is governed by an interface, i.e. all communication performed on top of Tuxedo using the SCA kernel can be conducted starting from the interface.

Figure 3:
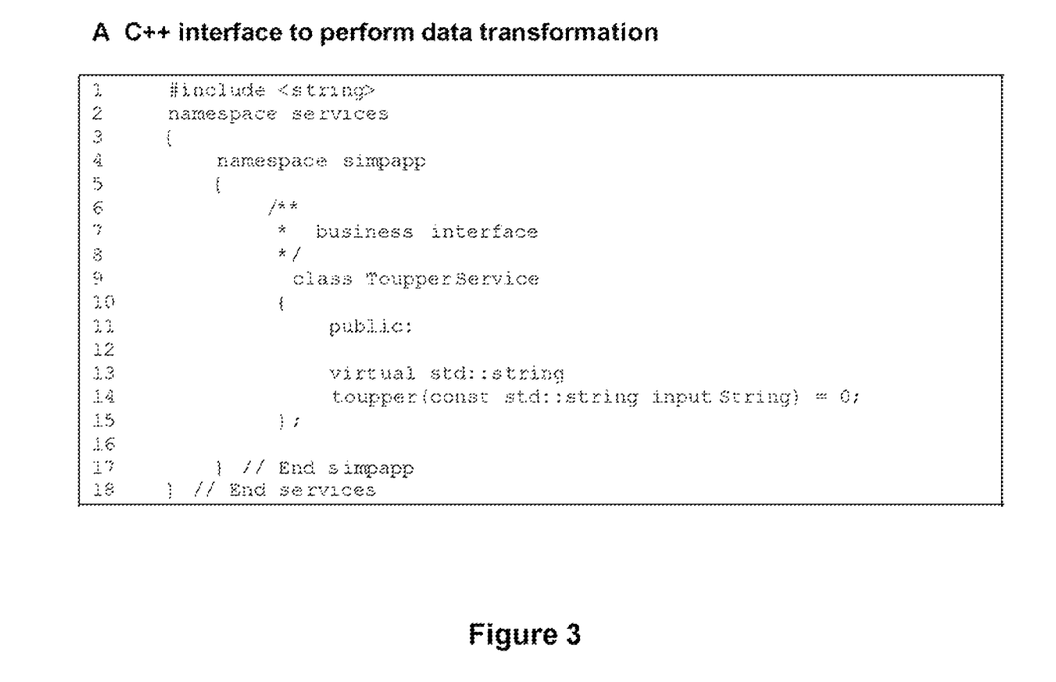
FIG. 3 is an illustration that shows an interface that governs data transformation used with Tuxedo as a binding, in accordance with an embodiment.

FIG. 3 is an example of such an interface in C++. As shown in FIG. 3, the Tuxedo service simpapp has its own name space within namespace services (Line 2). A C++ method toupper can be associated with this service (Lines 4-17).

The above example can send and receive a Tuxedo STRING buffer. With regard to the binding and reference extension implementations, the determination of the actual Tuxedo buffer to be used is provided by the contents of the /binding.atmi/bufferType element of the SCDL configuration. In addition, the type of buffer returned or sent is determined by a server or client, respectively. Both the client and server can be either an ATMI program or an SCA component.

In accordance with an embodiment, users can provide an XML or other schema that describes the SDO object. The schema is made available to the service or reference extension runtime using the /binding.atmi/schemaLocation element. The schema can be used internally to associate element names and field names.

Figure 4:
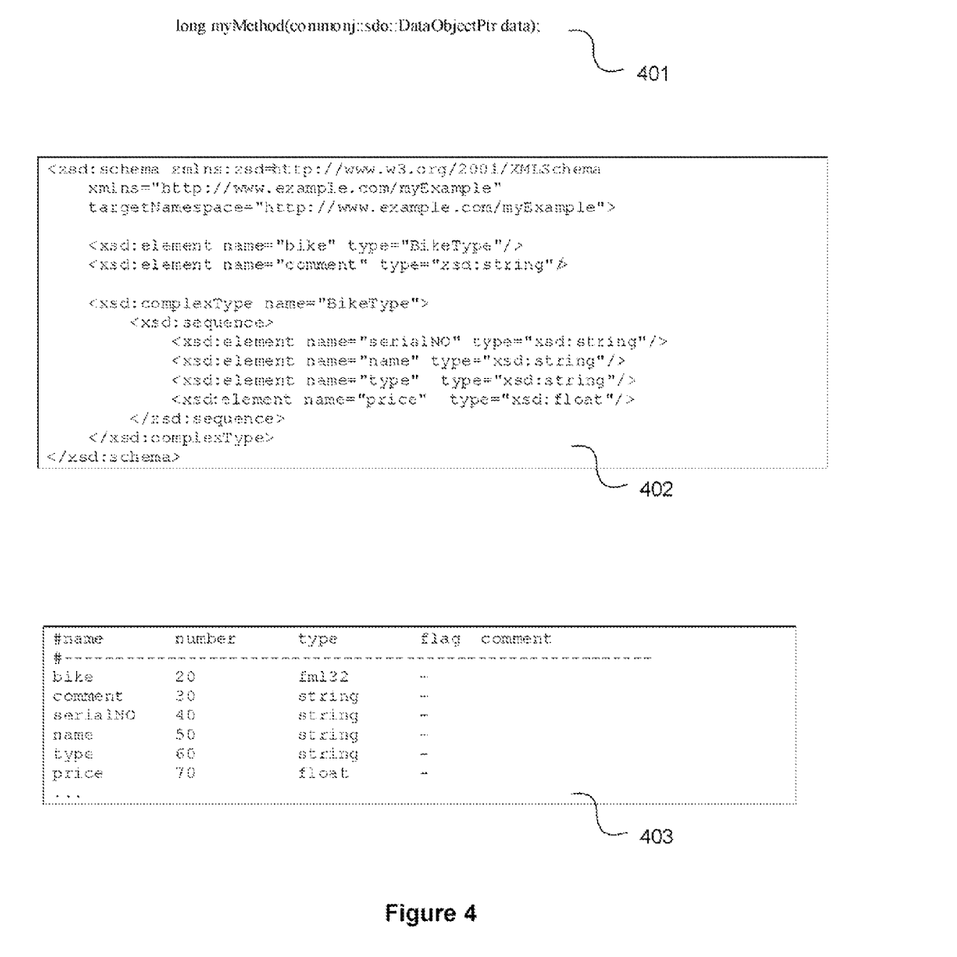
FIG. 4 is an illustration that shows an XML schema that describes an SDO object, in accordance with an embodiment.

FIG. 4 is an illustration that shows an XML schema that describes the SDO object, in accordance with an embodiment. As shown in FIG. 4, a C++ method prototype can be defined in a header 401, with an associated schema 402, that can generate a field table 403.

In accordance with an embodiment, there is no distinction made between SCA-SCA communication and SCA-ATMI communication, since components do not need to be aware of the type of implementation of the other side.

Invoking a Tuxedo Service from a Client Application

In accordance with an embodiment, the system provides two commands, buildscacomponent and buildscaserver, that can parse SCDL definitions and interfaces and produce a Tuxedo-deployable server along with Tuxedo-deployable elements, such as shared libraries containing SCA components and SCDL configuration. The buildscacomponent is used first to build the shared libraries containing the SCA components (as application code). Then, the buildscaserver command is used to build the server that can perform the interfacing between Tuxedo message queues and SCA components. In one example, the buildscaserver command takes source code (such as .c or .cpp files) and associated SCDL source as input, and the buildscaserver phase does not construct any application code.

Figure 5:
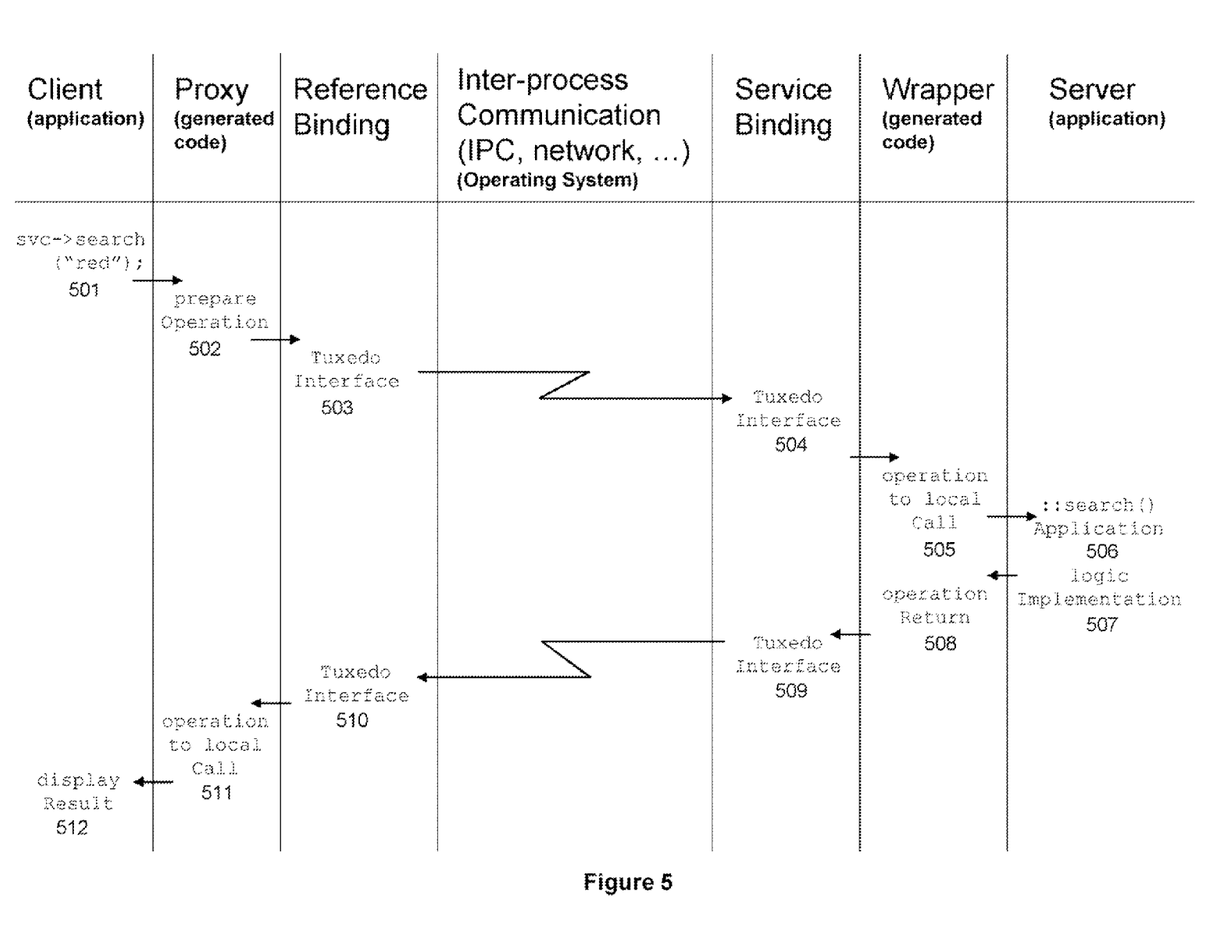
FIG. 5 is an illustration that shows the sequence of actions in an invocation of a service provided by a Tuxedo server, in accordance with an embodiment.

FIG. 5 is an illustration that shows the sequence of actions in an invocation of a service provides by a Tuxedo server, in accordance with an embodiment. At step 501, a client application sends a request to a SCA component through a proxy, which in turn performs a preparation operation, at step 502, to call a reference binding of the SCA component through the Tuxedo interface, at step 503. After inter-process communication, the SCA component invokes a service on a Tuxedo server through the service binding at step 504, whereas the service binding calls the wrapper object at step 505, which in turn invokes the service on the Tuxedo server at step 506. The logic implementation on the Tuxedo server then provides a response to the client through the steps of 507, 508, 509, 510, 511, and 512.

Using the Web Services Binding

In accordance with an embodiment, Web Service bindings are used to leverage the Web Service protocol such as SOAP gateways. The SCA components can physically be hosted in Tuxedo servers, and the communications from/to the Tuxedo servers can be performed through a Web Service gateway. SCA clients using a Web Services binding can remain unchanged whether the server is running in a Tuxedo environment or a native SCA environment (i.e. exposing the component using the Web Services binding for instance).

When SCA components are exposed using the Web Services binding (for example, binding.ws), the system provides tooling that can generate WSDF information, metadata entries and FML32 field definitions. For example, when SCDL code of SCA components to be hosted in a Tuxedo domain (i.e., service elements) contains <binding.ws> elements, the buildscaserver command generates a WSDF entry in a file named service.wsdf where 'service' can be replaced using the name of the service exposed. An accompanying service.mif and service.fml32 field table files are also generated, based on the contents of the WSDL interface associated with the Web Service. A WSDL interface can be composed by the user, and an error message is printed out, if no WSDL interface can be found.

Mapping of SOAP Types to C++ or Java

When a Web service binding, or binding.ws, is used, the data transformation includes inbound data transformation and outbound data transformation.

In accordance with an embodiment, the inbound data transformation includes two steps: first, a web service gateway transforms the SOAP message into a Tuxedo buffer; then, the reference extension runtime transforms the Tuxedo buffer into a C++ representation following the rules outlined above.

Similarly, the outbound data transformation also includes two steps: first, the service extension runtime transforms a C++ or Java representation into a Tuxedo buffer following the rules outlined above; then, a web service gateway transforms the Tuxedo buffer into a SOAP message.

Error Handling

In accordance with an embodiment, data transformation takes place at different times, such as when a reference extension is processing a client request; when a reference extension is processing a server reply; when a reference extension is processing a request; or when a reference extension is processing a reply. Correspondingly, error handling can also be implemented separately.

For the case when a reference extension processes a client request, an exception is thrown to the client. If the error takes place in a transaction, the transaction is rolled back.

For the case when a reference extension processes a server reply, an exception is thrown to the client process. If the error takes place in a transaction, the transaction is rolled back.

For the case when a service extension processes a request, the exception is caught and the call is terminated. A TPESYSTEM error is returned to the originating client. An error message is written to the ULOG with details of the exception. If the error takes place in a transaction, the failure return causes the transaction to be marked rollback-only.

For the case when a service extension processes a reply, the exception is caught and the call is terminated. A TPESYSTEM error is returned to the originating client. An error message is written to the ULOG with details of the exception. If the error takes place in a transaction, the failure return causes the transaction to be marked rollback-only.

In accordance with an embodiment, an error can be an actual combination of the following possible errors:
  a. Buffer types mismatch.
  b. Required fields in an FML or FML32 buffer not present or present in fewer than the required number of occurrences.
  c. Numeric values that cannot fit in the range of the destination type.
  d. String fields that cannot fit in the maximum length of the destination field.
  e. Exception thrown by SDO.
  f. Internal errors.

In accordance with an embodiment, an exception can be thrown and handled internally, thus its structure is not visible to the user. Exceptions may not be mapped between SCA and ATMI, and the specific data to be populated in each exception can vary.

Example 1

ATMI Process Call to an SCA Component

In accordance with an embodiment, an ATMI process can call an SCA component using the ATMI client as shown below:

```
myTuxInBuffer = tpalloc("STRING", NULL, myTuxInBufferMaxSize) ;
myTuxOutBuffer = tpalloc("STRING", NULL, myTuxOutBufferMaxSize) ;
strcpy(myTuxInBuffer, "MYINPUTSTRING") ;
tpcall("TOUPPER", myTuxInBuffer, 0, myTuxOutBuffer, &olen, flags) ;
printf("Result: %s\n", myTuxOutBuffer) ;
```

A metadata repository entry can be provided as shown below:

```
service=TOUPPER
export=y
servicetype=service
inbuf=STRING
outbuf=STRING
tuxservice=TOUPPER
```

A C++ interface can be generated from the above metadata repository entry, as shown below:

```
#ifndef TOUPPER_h
#define TOUPPER_h
#include <string>
class TOUPPER
{
public:
    virtual std::string TOUPPER(std::string) = 0;
}
#endif TOUPPER_h
```

A SCA component implementation excerpt is shown below:

```
namespace services
{
  namespace simpapp
  {
    std::string TOUPPER::TOUPPER(const string inputString)
    {
      string result = inputString;
      int len = inputString.size( ) ;
      for (int i = 0; i < len; i++) {
        result[i] = std::toupper(inputString[i]) ;
      }
      return result;
    }
  } // End simpapp
} // End services
```

The above service can be published in the SCA Composite definition as shown below:

```
<?xml version="1.0" encoding="UTF-8"?>
<composite xmlns=http://www.osoa.org/xmlns/sca/1.0 name=
"TOUPPERComposite">
    <service name="TOUPPER">
      <interface.cpp header="TOUPPER.h"/>
      <binding.atmi uri="tuxedo:TOUPPER(TOUPPER) ">
        <serviceType>RequestResponse</serviceType>
        <inputBufferType>STRING</inputBufferType>
        <outputBufferType>STRING</outputBufferType>
      </binding.atmi>
      <reference>TOUPPERComponent</reference>
    </service>
    <component name="TOUPPERComponent">
      <implementation.cpp library="TOUPPER" header=
"TOUPPERImpl.h"/>
    </component>
</composite>
```

In Example 1, the SCA component has no knowledge on whether the request is coming from an ATMI client, or from another SCA component. In accordance with an embodiment, although the above example uses metadata repository information, the use of service metadata is not required for data transformation. The metadata is used only to generate a SCDL file, and is not referenced at runtime. As a result, any size parameters configured for input, output, or error buffers in service metadata can be ignored during data mapping. A SCDL file generated without the use of metadata is equally valid for data transformation.

Example 2

ATMI Process Call to an SCA Component using Complex Data Type

In accordance with an embodiment, a service can handle a complex data type by taking one or more parameters sufficient to identify an employee as input and filling in the rest of the parameters for the complex data type. Example 2 below shows an ATMI client excerpt using complex data type.

```
myTuxInBuffer = (FBFR32 *)tpalloc("FML32", NULL,
myTuxInBufferMaxSize) ;
myTuxOutBuffer = (FBFR32 *)tpalloc("FML32", NULL,
myTuxOutBufferMaxSize) ;
empno = 12345;
Fadd32(myTuxInBuffer, FLD_EMPNO, (char *)&empno, 0) ;
tpcall("EMPINFO", myTuxInBuffer, 0, myTuxOutBuffer,
&olen,        flags) ;
Fprint32(myTuxOutBuffer) ;
```

An SCA component implementation excerpt is shown below:

```
namespace services
{
  namespace empapp
  {
    commonj::sdo::DataObjectPtr EmpinfoServiceImpl::empinfo(long
empno, string fname, string lname, string ssn, string dob, long emplevel)
    {
      commonj::sdo::DataObjectPtr rtnei;
      // Handle case where empid is key.
      EXEC SQL GET * FROM EMPLOYEE WITH EMPID =
      inputInfo.empid;
      //
      Fill in fields in SDO object rtnei.
      return rtnei;
    }
  } // End empapp
} // End services
```

The SCA Composite definition is shown below:

```
<?xml version="1.0" encoding="UTF-8"?>
<composite xmlns=http://www.osoa.org/xmlns/sca/1.0 name=
"EMPINFOComposite">
    <service name="EMPINFO">
      <interface.cpp header="EMPINFO.h"/>
      <binding.atmi uri="tuxedo:EMPINFO(EMPINFO) ">
        <serviceType>RequestResponse</serviceType>
        <inputBufferType>FML32</inputBufferType>
        <outputBufferType>FML32</outputBufferType>
      </binding.atmi>
      <reference>EMPINFOComponent</reference>
    </service>
    <component name="EMPINFOComponent">
      <implementation.cpp library="EMPINFO"
header="EMPINFOImpl.h"/>
    </component>
</composite>
```

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting interoperability between software components in a distributed transaction processing environment, comprising:
   providing, in a transaction application, a plurality of service oriented software components and a service component definition that defines interactions among said service oriented software components, wherein each said service oriented software component provides a service to process data in a SOAP message format;
   providing in the transaction application a transaction software component that calls a service provided by a said service oriented software component to process a transaction data in a native format of the transaction software component;
   providing a schema in a file, wherein the schema defines transformation of the transaction data between the SOAP message format and the native format;
   creating, in the transaction application, a host transaction software component to encapsulate said service oriented software components without using a gateway, and instead using a plurality of shared libraries that
      are generated from said service oriented software components, and
      contain entry points corresponding to interfaces of said service oriented software components and implementations of the interfaces;
   wherein upon receiving the transaction data from the transaction software component, the host transaction software component invokes the service, provided by the said service oriented component that is encapsulated by the host transaction software component, to process the transaction data.

2. The method according to claim 1, wherein each said service oriented software component includes a runtime reference binding extension which is an implementation of a client-side aspect of the service oriented software component, encapsulating code to call other services.

3. The method according to claim 2, wherein the reference binding runtime extension encapsulates environment variables to perform calls over one or more said software components.

4. The method according to claim 1, wherein each said service oriented software component includes a runtime service binding extension which is an implementation of a server-side aspect of the service oriented software component, encapsulating code and framework components to provide services.

5. The method according to claim 1, wherein the host transaction software component is a transaction server.

6. The method according to claim 1, wherein the transaction software component is exposed to other software components using a web service binding.

7. The method of claim 1, wherein the host transaction software component advertises a number of extra services for administrative purposes.

8. The method of claim 1, wherein requests received by the host transaction software component are assumed to be in a format suitable for processing by the -service oriented software component encapsulated by host transaction software component.

9. A system for supporting interoperability between software components in a distributed transaction processing environment, comprising:
   a computer including a readable storage medium and one or more microprocessors;
   a transaction application running on the computer, wherein the transaction application includes
      a plurality of service oriented software components, and
      a service component definition, wherein the service component definition defines interactions among the service oriented components, wherein each of the service oriented software components provides a service to process data in a SOAP message format,
      a transaction software component that calls service provided by a said service oriented software component to process a transaction data in a native format of the transaction software component;
      a schema file that defines transformation of the transaction data between the SOAP message format and the native format, and
      a host transaction software component created to encapsulate said service oriented software components without using a gateway, and instead using a plurality of shared libraries that
         are generated from said service oriented software components, and
         contain entry points corresponding to interfaces of said service oriented software components and implementations of the interfaces;
      wherein upon receiving the transaction data from the transaction software component, the host transaction software component invokes the service, provided by the said service oriented component that is encapsulated by the host transaction software component, to process the transaction data according to the schema.

10. The system according to claim 9, wherein each said service oriented software component includes a runtime reference binding extension which is an implementation of a client-side aspect of the service oriented software component, encapsulating code to call other services.

11. The system of claim 10, wherein the reference binding runtime extension encapsulates environment variables to perform calls over one or more software components.

12. The system according to claim 9, wherein each said service oriented software component includes a runtime service binding extension which is an implementation of a server-side aspect of the service oriented software component, encapsulating code and framework components to provide services.

13. The system according to claim 9, wherein the host transaction software component is a transaction server.

14. The system of claim 9, wherein the transaction software component is exposed to other software components using a web service binding.

15. The system of claim 9, wherein the host transaction software component advertises a number of extra services for administrative purposes.

16. The system of claim 9, wherein requests received by the host transaction software component are assumed to be in a format suitable for processing by the service oriented software component encapsulated by the host transaction software component.

17. A non-transitory machine readable storage medium having instructions stored thereon that when executed cause a system perform the steps comprising:
provided, in a transaction application, a plurality of service oriented software components and a service component definition that defines interactions among said service oriented software components, wherein each said service oriented software component provides a service to process data in a SOAP message format;
providing in the transaction application a transaction software component that calls a service provided by a said service oriented software component to process a transaction data in a native format of the transaction software component;
providing a schema in a file, wherein the schema defines transformation of the transaction data between the SOAP message format and the native format;
creating, in the transaction application, a host transaction software component to encapsulate said service oriented software components without using a gateway, and instead using a plurality of shared libraries that are generated from said service oriented software components, and
contain entry points corresponding to interfaces of said service oriented software components and implementations of the interfaces;
wherein upon receiving the transaction data from the transaction software component, the host transaction software component invokes the service, provided by the said service oriented component that is encapsulated by the host transaction software component, to process the transaction data.

18. The non-transitory machine readable storage medium of claim 17, wherein each said service oriented software component includes a runtime reference binding extension which is an implementation of a client-side aspect of the service oriented software component, encapsulating code to call other services.

19. The non-transitory machine readable storage medium of claim 17, wherein each said service oriented software component includes a runtime service binding extension which is an implementation of a server-side aspect of the service oriented software component, encapsulating code and framework components to provide services.

20. The non-transitory machine readable storage medium of claim 17, wherein the host transaction software component is a transaction server.

* * * * *

UNITED STATES PATENT AND TRADEMARK OFFICE
CERTIFICATE OF CORRECTION

PATENT NO. : 8,918,451 B2  
APPLICATION NO. : 12/646704  
DATED : December 23, 2014  
INVENTOR(S) : Edward Heeren et al.

Page 1 of 1

It is certified that error appears in the above-identified patent and that said Letters Patent is hereby corrected as shown below:

Title Page, item (73)

Page 1, column 1, under Assignee, line 1, delete "Coproration" and insert -- Corporation --, therefor.

In the specification

Column 2, line 11, delete "datatype" and insert -- data type --, therefor.

Column 2, line 59, delete "The" and insert -- the --, therefor.

Column 4, line 51, delete "CompositeContext::getCurrent( )" and insert
-- CompositeContext::getCurrent( ), --, therefor.

Column 11, line 52, delete "data." and insert -- data according to the schema. --, therefor.

In the claims

Column 12, line 11, Claim 8, delete "-service" and insert -- service --, therefor.

Column 12, line 12, Claim 8, after "by" insert -- the --.

Column 13, line 11, Claim 17, after "system" insert -- to --.

Column 14, line 11, Claim 17, delete "data." and insert -- data according to the schema. --, therefor.

Signed and Sealed this
Seventeenth Day of May, 2016

Michelle K. Lee
*Director of the United States Patent and Trademark Office*